Jan. 27, 1942.  J. KOLBE  2,271,505
AUTOMOTIVE VEHICLE
Filed June 19, 1939  3 Sheets-Sheet 1

INVENTOR
Joachim Kolbe.
BY
ATTORNEYS.

Jan. 27, 1942. J. KOLBE 2,271,505
AUTOMOTIVE VEHICLE
Filed June 19, 1939 3 Sheets-Sheet 2

INVENTOR
Joachim Kolbe.
BY Pike, Calver & Gray
ATTORNEYS.

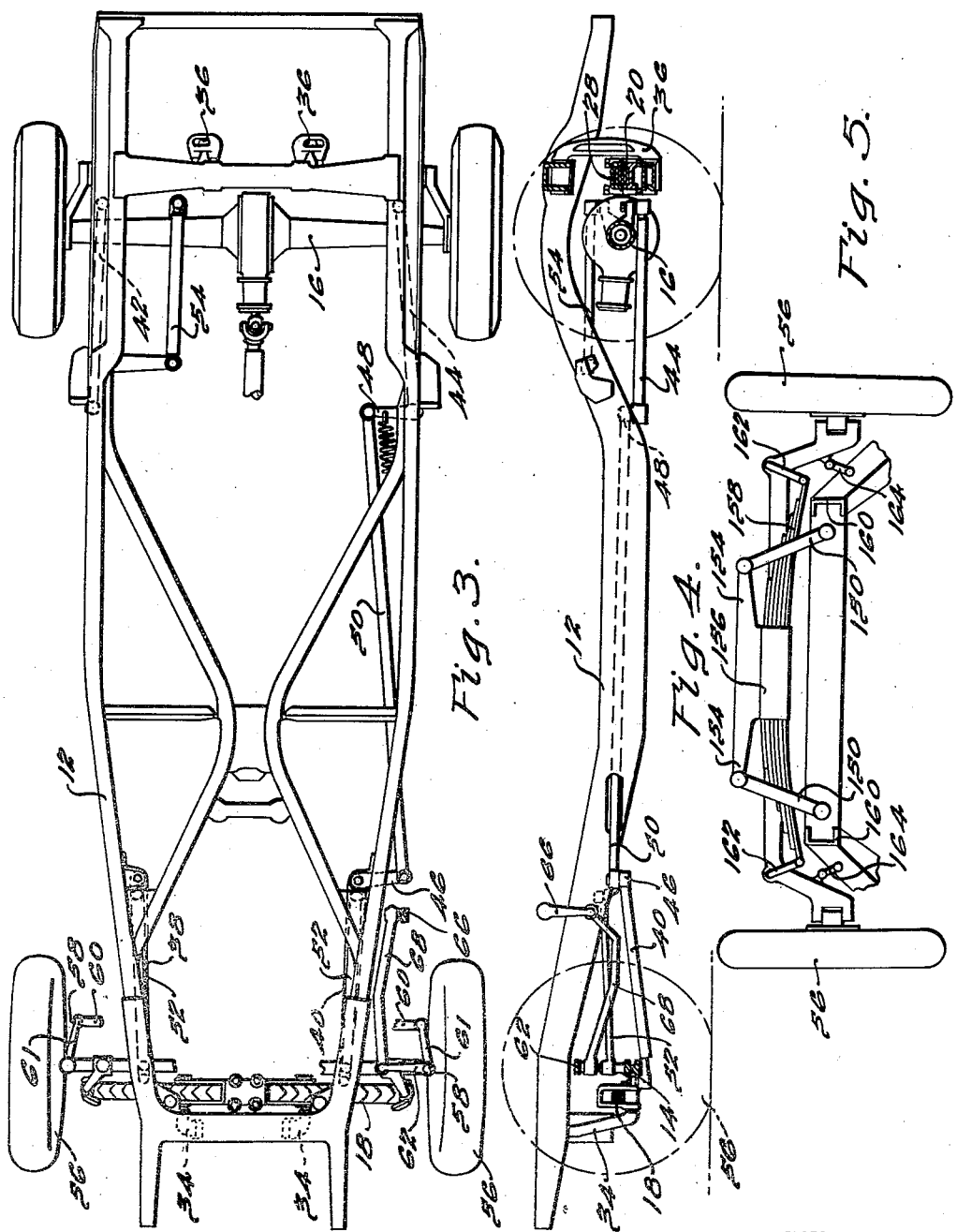

Patented Jan. 27, 1942

2,271,505

UNITED STATES PATENT OFFICE 2,271,505

AUTOMOTIVE VEHICLE

Joachim Kolbe, Detroit, Mich.

Application June 19, 1939, Serial No. 279,845

13 Claims. (Cl. 280—112)

This invention relates to vehicles, and more particularly to motor vehicles having bodies or superstructures which are so mounted on the wheel supporting means that the body or superstructure may assume an inclined or banked position under the influence of lateral or centrifugal forces to which the vehicle is subjected, such for example as when the vehicle rounds a curve. The invention also contemplates vehicles having the bodies or superstructures so mounted on the wheel supporting means that the superstructure or body will remain in a level position when subjected to lateral or centrifugal forces.

In certain types of vehicles embodying this invention it is desirable that the superstructure be free to shift laterally and vertically relative to the wheel supporting means when it moves to an inclined or banked position relative to the wheel supporting means. In those types of vehicles, it is therefore desirable to interconnect the superstructure and the wheel supporting means in such a manner that the superstructure shifts to an inclined position relative to the wheel supporting means when subjected to lateral forces.

An object of this invention is therefore to provide improved connecting means between the superstructure and wheel supporting means whereby the superstructure may move laterally and vertically relative to the wheel supporting means when it assumes an inclined or banked position.

A further object of the invention is to provide interconnected generally horizontally disposed connecting means between the superstructure and wheel supporting means to maintain the wheel supporting means in substantially the same lateral relation relative to each other as the superstructure assumes an inclined or banked position.

Another object of the invention resides in the provision of improved generally horizontally disposed connecting means cooperating with generally vertically disposed connecting means between the superstructure and wheel supporting means of a vehicle, whereby the superstructure may assume an inclined or banked position accompanied by proportionate lateral and vertical movements thereof relative to the wheel supporting means when subjected to lateral forces.

A still further object is to provide novel connecting means between a superstructure and wheel supporting means including generally vertically and horizontally disposed trapezoidal shaped connections to resist vertical and horizontally directed forces, whereby the superstructure may assume a substantially predetermined banked or inclined position accompanied by substantially predetermined lateral and vertical displacement of the superstructure relative to the wheel supporting means when subjected to substantially predetermined lateral forces.

Yet another object of the invention is to provide generally horizontally disposed torque and brake force transmitting means interconnecting the wheel supporting means and superstructure of a vehicle having the superstructure so mounted that it may assume an inclined or banked position relative to the wheel supporting means under the influence of lateral forces.

Another object of the invention is to provide an improved steering mechanism including a generally horizontally disposed longitudinally movable bar operable to transmit steering movements to the steerable wheels as the superstructure moves to an inclined or banked position relative to the wheel supporting means.

Other objects and advantages of this invention will be apparent from the following detailed description, considered in connection with the accompanying drawings, submitted for purposes of illustration only and not intended to define the scope of the invention, reference being had for that purpose to the subjoined claims.

In the drawings, wherein similar reference characters refer to similar parts throughout the several views:

Figure 3 is a plan view of the embodiment illustrated in Figure 1;

Figure 4 is a side elevation, partly in section of the embodiment illustrated in Figure 1, and Figure 5 is a front view of a further modified form of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
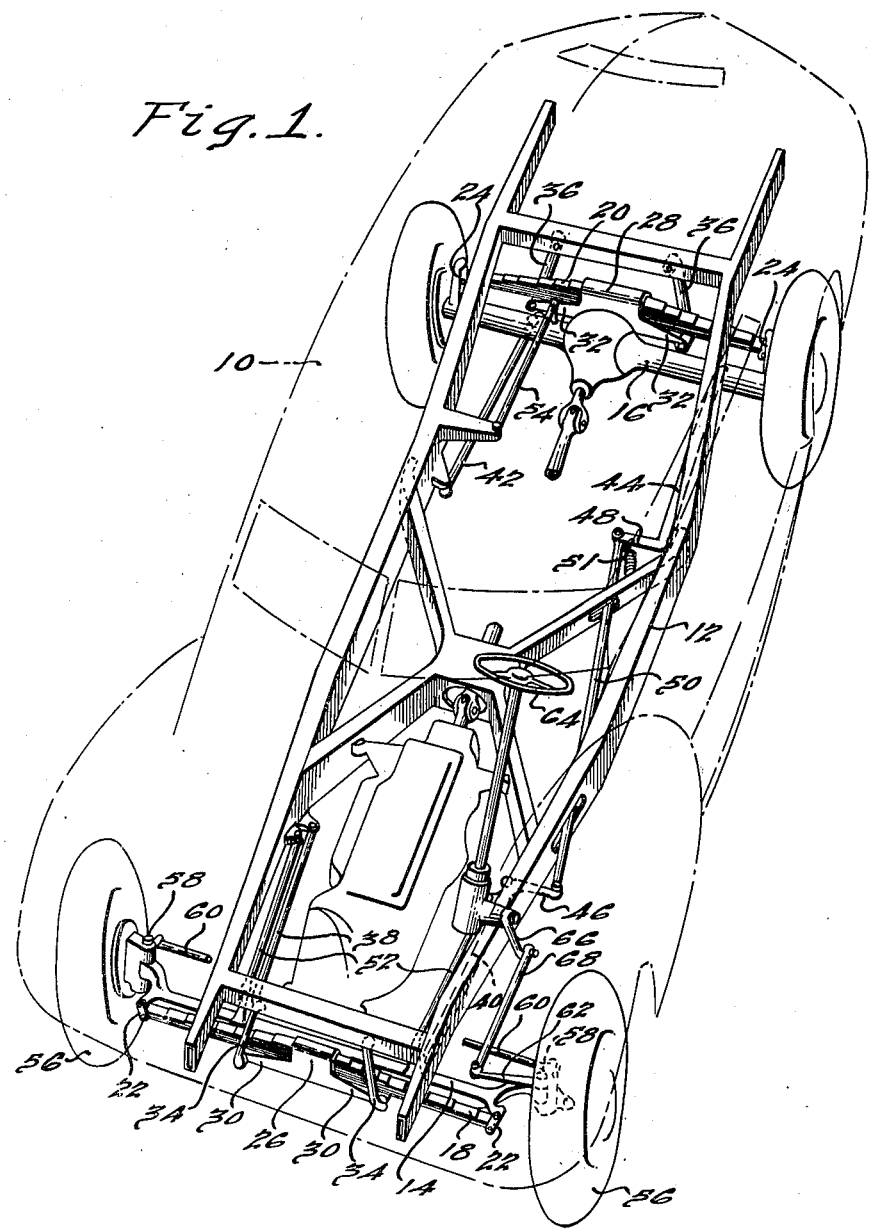
Figure 1 is a perspective view of a vehicle embodying the present invention, the superstructure being shown in the normal or upright position.

Referring now to Figure 1, the invention is illustrated as applied to a vehicle having a superstructure or body 10 including a longitudinally extending frame member 12. If desired, the body or superstructure 10 may be of the so-called unison type wherein the frame member is formed as an integral part of the body, or a separate frame member may be employed.

The vehicle includes front and rear wheel supporting means 14 and 16 respectively, which in the embodiment illustrated in Figure 1, includes rigid axles. Resilient means, such for example as transversely extending front and rear leaf springs 18 and 20 may be operatively connected to the front and rear axles by means of shackles 22 and 24 respectively. Front and rear spring saddles or supports 26 and 28 respectively may be mounted on the front and rear springs 18 and 20 as illustrated, and may be provided with laterally extending arms 30 and 32 respectively to pivotally receive the lower ends of paired front and rear angularly inclined links or supporting means 34 and 36 respectively. The upper ends of the links 34 and 36 may be pivotally connected to the frame 12 of the superstructure or body whereby the superstructure is free to assume an angularly inclined or banked position transversely of the wheel supporting means, accompanied by a lateral and vertical shifting thereof relative to the wheel supporting means under certain operating conditions.

It is an inherent characteristic of this linkage arrangement including paired front and rear angularly inclined links having their upper ends pivotally connected to the superstructure and their lower ends pivotally connected to the wheel supporting means, that the superstructure moves under the influence of centrifugal forces in the direction of said forces, and at the same time the center of gravity of the superstructure moves downwardly. During this movement the superstructure will be guided above the links to an inclined or banked position, since the upper ends of the links located on the side from which the centrifugal force is exerted move downwardly more than the upper ends of the links located on the other side of the vehicle move upwardly.

During this movement of the superstructure the exact focus about which it turns will progressively shift as the superstructure assumes the banked position and may be determined by extending the centerline of each link of front and rear links until it intersects the centerline of the other link of the pair. Since the links change their location turning about their connecting pivots to the wheel supporting means, the focus must progressively shift since the one link lowers more than the other link of each pair rises, and the focus will lower correspondingly. This imaginary intersection of the links may be referred to as the "center of motion."

The front and rear wheel supporting means or axles 14 and 16 may be maintained in proper longitudinal relationship relative to the superstructure or body 10 by means of generally horizontally disposed rods or members 38 and 40 interconnecting the superstructure and the front wheel supporting means or axle 14, and generally horizontally disposed longitudinally extending rods or members 42 and 44 interposed between the superstructure 10 and the rear wheel supporting means 16. These rods may be connected to the superstructure and axles by means of joints whereby the axles may shift laterally and longitudinally relative to the superstructure under certain operating conditions. The rods 38 and 40 at the front, and the rods 42 and 44 at the rear of the vehicle are positioned in such a manner that the ends of the rods pivotally connected to the axles are slightly closer together than the ends which are connected to the superstructure. This generally trapezoidal shaped connection ensures that the axles or other wheel supporting means will be maintained in proper angular relation relative to each other and to the superstructure under various operating conditions including that when the superstructure assumes an inclined or banked position relative to the wheel supporting means or axles.

A pair of front and rear rods may be interconnected to induce uniform lateral displacement of the front and rear wheel supporting means relative to the superstructure. For instance the rod 40 at the front of the vehicle may be provided with a laterally extending arm 46, and the rod 44 at the rear of the vehicle may be provided with an arm 48 extending laterally therefrom in a direction opposite to the arm 46. These arms 46 and 48 may be interconnected by means of a rod or member 50 whereupon lateral displacement of the front and rear wheel supporting means 14 and 16 will be maintained uniform, and longitudinally spaced points of the superstructure will be maintained in substantially the same angular relation relative to the wheel supporting means as the superstructure assumes an inclined or banked position relative to the wheel supporting means.

Figure 2:
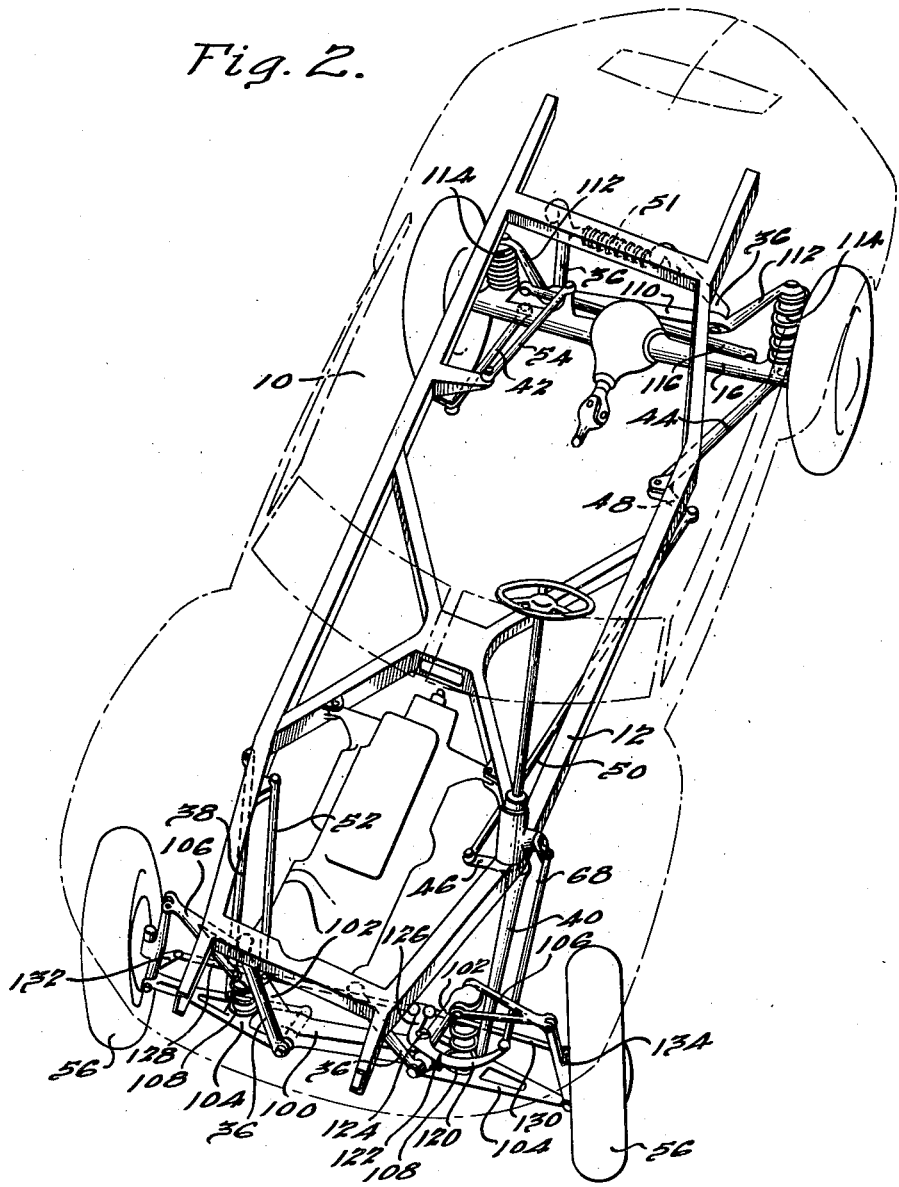
Figure 2 is a perspective view showing a somewhat modified form of the invention, the superstructure being shown in a banked or inclined position relative to the wheel supporting means.

In the embodiment illustrated in Figures 1 and 2, the movement of the superstructure or body 10 to an inclined or banked position is accompanied by a lowering of the superstructure relative to the wheel supporting means. Resilient means may be employed to return the superstructure to the normal or upright position illustrated in Figure 1. This resilient means may take many varied forms, and may be positioned in many different locations, such for example as the spring 51 interposed between the arm 48 and a portion of the frame 12 to resiliently urge the connecting means between the front and rear wheel supporting means back to normal position after it has been displaced by movement of the superstructure to the banked position. The spring 51 may be of any suitable type to transmit force in opposite directions, that is in tension or compression.

The brake forces from the wheels may be transmitted to the superstructure by means of front and rear brake force transmitting rods 52 and 54 respectively jointedly interconnecting the front and rear wheel supporting means with spaced points of the superstructure as illustrated, or these forces may be transmitted through the guide rods or members 38, 40, 42 and 44. In the embodiment illustrated, a single brake force transmitting rod 54 is employed at the rear wheel supporting means or axle 16, however dual transversely spaced brake force transmitting rods 52 may be employed at the front wheel supporting means or axle 14. If the rigidity of the front wheel supporting means 14 is sufficient, a single brake force transmitting member will be adequate, rather than the dual members disclosed. Where both the guide rods and the brake and torque transmitting rods are employed, it is preferable that they be disposed in different vertical planes.

The front steerable wheels 56 are pivotally mounted on generally vertically extending king pins 58 carried by the front wheel supporting means, and may be turned about the king pins to steer the vehicle. The wheels 56 are interconnected by means of a transversely extending tie rod 60 pivotally connected to arms 61, and may be actuated by means of a generally laterally extending arm 62 operatively connected to one of the steerable wheels. Steering of the vehicle may be effected by means of a manually controlled steering wheel 64 projecting into the passenger compartment of the body 10 and operably connected to move the generally vertically disposed crank arm 66 longitudinally of the vehicle. The ends of the crank arms 62 and 66 may be interconnected by means of a generally longitudinally movable rod 68 to transmit steering movements of the manually controlled wheel 64 to the steerable wheels 56. The rod 68 may be disposed parallel to the horizontally disposed rods or members 38 and 40, and move substantially in unison therewith as the superstructure assumes an inclined or banked position relative to the wheel supporting means. The rod 68 therefore compensates for the movements of the resilient means or springs 18 and the movement of the generally vertically disposed links 34 whereby the superstructure may assume an inclined or banked position relative to the wheel supporting means. No additional link movement equalizing means is necessary because the rod 68 and the guide rods 38 and 40 move along parallel arcs as the superstructure is moved to an inclined or banked position.

Figure 2 shows an embodiment of the invention which is similar in many respects to that of Figure 1, with the exception that independent wheel suspension means is employed to support the steerable wheels 56, rather than the rigid transversely extending axle 14 of Figure 1. As illustrated, the suspension of Figure 2 employs a supporting member 100 having upwardly and outwardly extending arms 102. Vertically oscillatable wishbone members 104 are pivotally mounted to the member 100 preferably at the juncture of the arms 102 with the member 100. Auxiliary generally transversely extending wishbone members 106 are pivotally mounted at the extremities of the arms 102. Resilient means such as coil springs 108 may be interposed between the upper ends of the arms 102 and the wishbone members 104 as illustrated. If desired the resilient means may be interposed at other points between the members 104 and 106 to resiliently absorb vertical shocks.

The front paired angularly inclined superstructure supporting links 36 may be pivotally connected to the member 100 at the juncture of the wishbone members 104, or at any other suitable transversely spaced points thereof.

At the rear of the vehicle illustrated in Figure 2, a transversely extending member 110 having upwardly and outwardly extending arms 112 may be provided to receive the paired angularly inclined superstructure supporting links or members 36 by means of joints at the juncture of the arms 112, or at any other suitable transversely spaced points thereof. Resilient means, such for example as coil springs 114, may be interposed between the wheel supporting means or axle 16 and the outer extremities of the arms 112 or at other suitable points. A generally transversely extending rod or member 116 may be pivotally connected to the transversely extending member 110 at one end, and to the axle 16 at the other end to prevent undesirable lateral displacement of the member 110 relative to the axle 16.

In the operation of this device, as the vehicle is subjected to lateral forces, such for example as the centrifugal force developed as the vehicle rounds a curve, the lateral force urges the superstructure 10 to shift laterally on the supporting links 34 and 36 to an inclined or banked position relative to the wheel supporting means. The rods 38 and 40 at the front and 42 and 44 at the rear limit undesirable longitudinal movement of the superstructure relative to the wheel supporting means, and permit limited vertical displacement as the superstructure shifts laterally on the supporting links 34 and 36 to an inclined or banked position. The rods 38 and 40 at the front may in this embodiment be jointedly connected to the wishbone members 104 or to the member 100 or at any other suitable point on the wheel supporting means. The rod 50 interconnecting the arms 46 and 48 carried by the guide members 40 and 44 respectively, ensure uniform lateral movement of the superstructure relative to the wheel supporting means as it assumes an inclined or banked position relative thereto. As the force inducing the shifting of the superstructure to the banked position decreases, the resilient means or spring 51 urges the superstructure to return to the normal or generally upright position.

In the embodiment of Figure 2 the generally longitudinally extending steering member 68 is substantially parallel to the guide members 38 and 40, and is operably connected to an arm 120 of a bell crank 122 pivotally mounted to the member 100 at 124. The other arm 126 of the bell crank is operably connected to steer the wheels 56 by means of transversely extending tie rods 128 and 130 operably connected to the wheels through crank arms 132 and 134 respectively.

If limited angular relation between the superstructure and wheel supporting means is desired, such for example sufficient to prevent the superstructure from moving to a position inclined to the outside of the curve, connecting means between the superstructure and wheel supporting means of the general type illustrated in Figure 5 may be employed. This connecting means may comprise paired angularly inclined links 150 jointedly connected at their lower ends to the frame 160 of the superstructure or vehicle body, and jointedly connected at their upper ends to spaced arms 154 carried by a spring supporting member 156 which carries resilient means such for example as a transversely extending leaf spring 158 operably connected to axle 152 by means of shackles 162. In this embodiment of the invention, undesirable longitudinal movement of the wheel supporting means 152 relative to the frame 160 of the superstructure may be prevented by means of generally horizontally disposed longitudinally extending members 164 of a type similar to the members 38 and 40 of Figure 1. If desired, an additional brake and torque force transmitting tube of the general type illustrated at 52 and 54 of the embodiment of Figures 1 and 2 may also be employed.

In this embodiment the superstructure will be lifted relative to the wheel supporting means as it moves to an inclined or banked position, and will be returned to the normal or generally upright position by the force of gravity. Resilient means to return the superstructure to the normal position, such for example as the spring 51 of Figure 1 are therefore unnecessary in this embodiment of the invention. The construction and operation of the device is substantially similar to that of Figures 1 and 2 except for this feature.

I claim:

1. In a vehicle having front and rear wheel supporting means including rigid axles, resilient means carried by said axles, a superstructure, connecting means between the superstructure and resilient means comprising paired front and rear angularly inclined links whereby the superstructure may pivot about a center of motion located at the theoretical intersection of said links and assume an inclined or banked position accompanied by a progressive lowering of the center of motion relative to the resilient means when subjected to lateral forces, generally longitudinally extending front and rear connecting means interconnecting the axles and superstructure to prevent undesirable longitudinal movement of the superstructure relative to the wheel supporting means, and motion transmitting means interposed between said front and rear connecting means.

2. In a vehicle having front and rear wheel supporting means including rigid axles, resilient means carried by said axles, a superstructure, connecting means between the superstructure and resilient means comprising paired front and rear angularly inclined links whereby the superstructure may assume an inclined or banked position accompanied by a lowering of its center of gravity relative to the resilient means when subjected to lateral forces, paired generally longitudinally extending front and rear connecting means interconnecting the axles and superstructure to prevent undesirable longitudinal movement of the superstructure relative to the wheel supporting means, the ends of the generally longitudinally extending connecting means adjacent the axles being closer together than the ends adjacent the superstructure, and motion transmitting means interconnecting the front and rear longitudinally extending connecting means.

3. In a vehicle having front and rear wheel supporting means including rigid axles, resilient means carried by said axles, a superstructure, connecting means between the superstructure and resilient means comprising paired front and rear angularly inclined links whereby the superstructure may pivot about a center of motion located at the theoretical intersection of said links and assume an inclined or banked position accompanied by a lowering of its center of gravity relative to the resilient means when subjected to lateral forces, generally longitudinally extending connecting means between the axles and superstructure to prevent undesirable longitudinal movement of the superstructure relative to the wheel supporting means, connecting means between front and rear longitudinally extending connecting means, and resilient means operably connected to said connecting means to return the superstructure to its normal position as the lateral force is decreased.

4. In a vehicle having front and rear wheel supporting means including rigid axles, resilient means carried by said axles, a superstructure, connecting means between the superstructure and resilient means comprising paired front and rear angularly inclined links whereby the superstructure may assume an inclined or banked position accompanied by a lowering of its center of gravity relative to the resilient means when subjected to lateral forces, generally longitudinally extending front and rear guiding connecting means between the axles and superstructure to prevent undesirable longitudinal movement of the superstructure relative to the wheel supporting means, motion transmitting means interconnecting the last named front and rear guiding connecting means and auxiliary generally longitudinally extending connecting means between the axles and superstructure in a different vertical plane than the generally longitudinally extending guiding means and cooperating therewith to transmit brake and torque reactions between the superstructure and wheel supporting means.

5. In a vehicle having front and rear wheel supporting means, a superstructure, connecting means comprising front and rear paired angularly inclined links directly interconnecting the wheel supporting means and superstructure whereby the superstructure may assume an inclined or banked position relative to the wheel supporting means under the influence of lateral forces, paired generally longitudinally extending members interconnecting the wheel supporting means and superstructure, oppositely disposed crank arms carried by two of said longitudinally extending members, and connecting means between said crank arms to induce the superstructure to assume substantially uniform lateral movement relative to the front and rear wheel supporting means accompanied by a shortening of the distance between the front and rear wheel supporting means.

6. In a vehicle having front and rear wheel supporting means, a superstructure, connecting means comprising paired angularly inclined links between the wheel supporting means and superstructure whereby the superstructure may assume an inclined or banked position accompanied by a lowering of its center of gravity relative to the wheel supporting means when subjected to lateral forces, paired generally longitudinally extending members interconnecting the wheel supporting means and superstructure, oppositely disposed crank arms carried by two of said longitudinally extending members, and connecting means between said crank arms to induce the front and rear wheel supporting means to assume substantially uniform lateral displacement relative to the superstructure as the superstructure assumes an inclined or banked position.

7. In a vehicle having front and rear wheel supporting means, a superstructure, connecting means comprising front and rear spaced angularly inclined segmental links interconnecting the wheel supporting means and superstructure whereby the superstructure may pivot about a center of motion located at the theoretical intersection of said segmental links and assume an inclined or banked position accompanied by a lowering of the center of gravity of the superstructure and a lowering of the center of motion relative to the wheel supporting means under the influence of lateral forces, paired generally longitudinally extending members interconnecting the wheel supporting means and superstructure, oppositely disposed crank arms carried by two of said longitudinally extending members, connecting means between said crank arms to induce the superstructure to assume substantially uniform lateral movement relative to the wheel supporting means when the superstructure moves to an inclined or banked position, and resilient means operably connected to the last named connecting means to return the superstructure to its normal position.

8. In a vehicle having front and rear wheel supporting means, a superstructure, paired front and rear generally longitudinally extending connecting means between the wheel supporting means and superstructure, motion transmitting means interconnecting said front and rear longitudinally extending connecting means and paired angularly inclined supporting means between the superstructure and wheel supporting means cooperating with the generally horizontally extending connecting means whereby the superstructure may assume an inclined or banked position accompanied by a lowering of its center of gravity relative to the wheel supporting means when subjected to lateral forces.

9. In a vehicle having front and rear wheel supporting means, a superstructure, paired angularly inclined supporting means jointedly interconnecting the superstructure and wheel supporting means whereby the superstructure may pivot about a center of motion located at the theoretical intersection of the supporting means and assume an inclined or banked position accompanied by a lowering of its center of motion relative to the wheel supporting means under the influence of lateral forces, paired generally longitudinally extending connecting means between the wheel supporting means and superstructure to prevent undesirable longitudinal movement of the wheel supporting means relative to the superstructure, and connecting means between front and rear generally longitudinally extending connecting means to induce the superstructure to assume substantially the same lateral relation relative to the wheel supporting means as it assumes an inclined or banked position.

10. In a vehicle having front and rear wheel supporting means, a superstructure, paired angularly inclined supporting means jointedly interconnecting the superstructure and wheel supporting means whereby the superstructure may pivot about a shiftable center of motion located at the theoretical intersection of the supporting means and assume an inclined or banked position accompanied by a progressive lateral shifting of the center of motion relative to the wheel supporting means under the influence of lateral forces, paired generally longitudinally extending connecting means between the wheel supporting means and superstructure to prevent undesirable longitudinal movement of the wheel supporting means relative to the superstructure, and connecting means between front and rear generally longitudinally extending connecting means to induce the front and rear wheel supporting means to assume substantially uniform lateral displacement relative to the superstructure as it assumes an inclined or banked position relative to the wheel supporting means.

11. In a vehicle having wheel supporting means, a superstructure, connecting means between the superstructure and wheel supporting means comprising paired angularly inclined links whose upper ends are pivotally connected to the wheel supporting means and whose lower ends are pivotally connected to the superstructure whereby the superstructure may pivot about a longitudinal axis located at the theoretical intersection of the links and assume an inclined or banked position accompanied by a lowering of said longitudinal axis when subjected to lateral forces, generally longitudinally extending connecting means between the superstructure and wheel supporting means to prevent undesirable longitudinal movement of the superstructure relative to the wheel supporting means, and motion transmitting means interconnecting said generally longitudinally extending connecting means.

12. In a vehicle having a rear rigid axle, resilient means including transversely spaced coil springs carried by the rigid axle, a generally transversely extending member engaging said coil springs, a generally transversely extending guide bar interposed between said member and axle to limit lateral movement of the member relative to the axle, a superstructure, and connecting means between the superstructure and generally transversely extending member comprising angularly inclined links whereby the superstructure may assume an inclined or banked position accompanied by a lowering of its center of gravity relative to the member when subjected to lateral forces.

13. In a vehicle having front wheel supporting means including a generally transversely extending member having upwardly and outwardly projecting arms, paired upper and lower generally transversely extending wishbone shaped arms pivotally mounted to said member and arms, steerable wheels carried at the extremity of said wishbone shaped arms, a superstructure, connecting means between the superstructure and said generally transversely extending member whereby the superstructure may assume an inclined or banked position accompanied by a lowering of its center of gravity relative to said member when subjected to lateral forces, generally longitudinally extending connecting means between the wheel supporting means and superstructure to limit longitudinal movement of the superstructure relative to the wheel supporting means, a bell crank carried by the transversely extending member, actuating means between one arm of the bell crank and the steerable wheels, a longitudinally movable member substantially parallel to said longitudinally extending connecting means and movable in the same arc therewith as the superstructure assumes a banked position operably connected to another arm of the bell crank to actuate the steerable wheels, and manually controlled means to actuate the longitudinally movable member.

JOACHIM KOLBE.